US012701200B2

(12) United States Patent
Binboga et al.

(10) Patent No.: US 12,701,200 B2
(45) Date of Patent: Aug. 4, 2026

(54) SYSTEMS AND METHODS FOR RECEIVE-SIDE CUSTOMIZATION OF PRESENTATION OF MIXED MEDIA DATA

(71) Applicant: Intel Corporation, Santa Clara, CA (US)

(72) Inventors: Evrim Binboga, Pleasanton, CA (US); Stanley J. Baran, Chandler, AZ (US); Anh Viet Nguyen, Beaverton, OR (US); Aline C. Kenfack Sadate, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 137 days.

(21) Appl. No.: 18/343,593

(22) Filed: Jun. 28, 2023

(65) Prior Publication Data

US 2025/0008056 A1 Jan. 2, 2025

(51) Int. Cl.
H04N 7/15 (2006.01)
H04N 7/14 (2006.01)

(52) U.S. Cl.
CPC ............. H04N 7/152 (2013.01); H04N 7/147 (2013.01)

(58) Field of Classification Search
CPC ............................... H04N 7/152; H04N 7/147
USPC ................................ 348/14.01, 14.08, 14.09
See application file for complete search history.

(56) References Cited

U.S. PATENT DOCUMENTS

| | | | |
|---|---|---|---|
| 11,847,377 B2 * | 12/2023 | Abhishek .............. G10L 19/008 |
| 2014/0152758 A1 | 6/2014 | Tong et al. |
| 2014/0198121 A1 | 7/2014 | Tong et al. |
| 2015/0213604 A1 | 7/2015 | Li et al. |

FOREIGN PATENT DOCUMENTS

| | | | | |
|---|---|---|---|---|
| CN | 110502980 A | 11/2019 |
| EP | 1933525 A1 | 6/2008 |
| KR | 20120076455 | * 7/2012 ............. G06Q 50/10 |
| KR | 1020130088558 A | 8/2013 |
| KR | 1020200103435 B1 | 2/2021 |
| KR | 1020200004388 B1 | 3/2022 |

OTHER PUBLICATIONS

PCT International Search Report and Written Opinion issued in PCT/US2023/079686, dated Mar. 22, 2024; 10 pages.

* cited by examiner

*Primary Examiner* — Yosef K Laekemariam
(74) *Attorney, Agent, or Firm* — Alliance IP, LLC

(57) ABSTRACT

Systems and methods for receive-side customization of presentation of mixed media data. Systems and methods focus on the receive path so that each participant in a video conference or other mixed media application can, as a receiver of mixed media data signals, customize the individual incoming mixed media data signals for display on the receiver's user device. User customization options include blocking video or avatars, converting (to avatars), and filtering distracting behavior. Embodiments enable all participating users (not just a host user) to respectively receive-side customize the presentation/display of the mixed media data. Additionally, systems and methods can be implemented in an existing server.

20 Claims, 6 Drawing Sheets

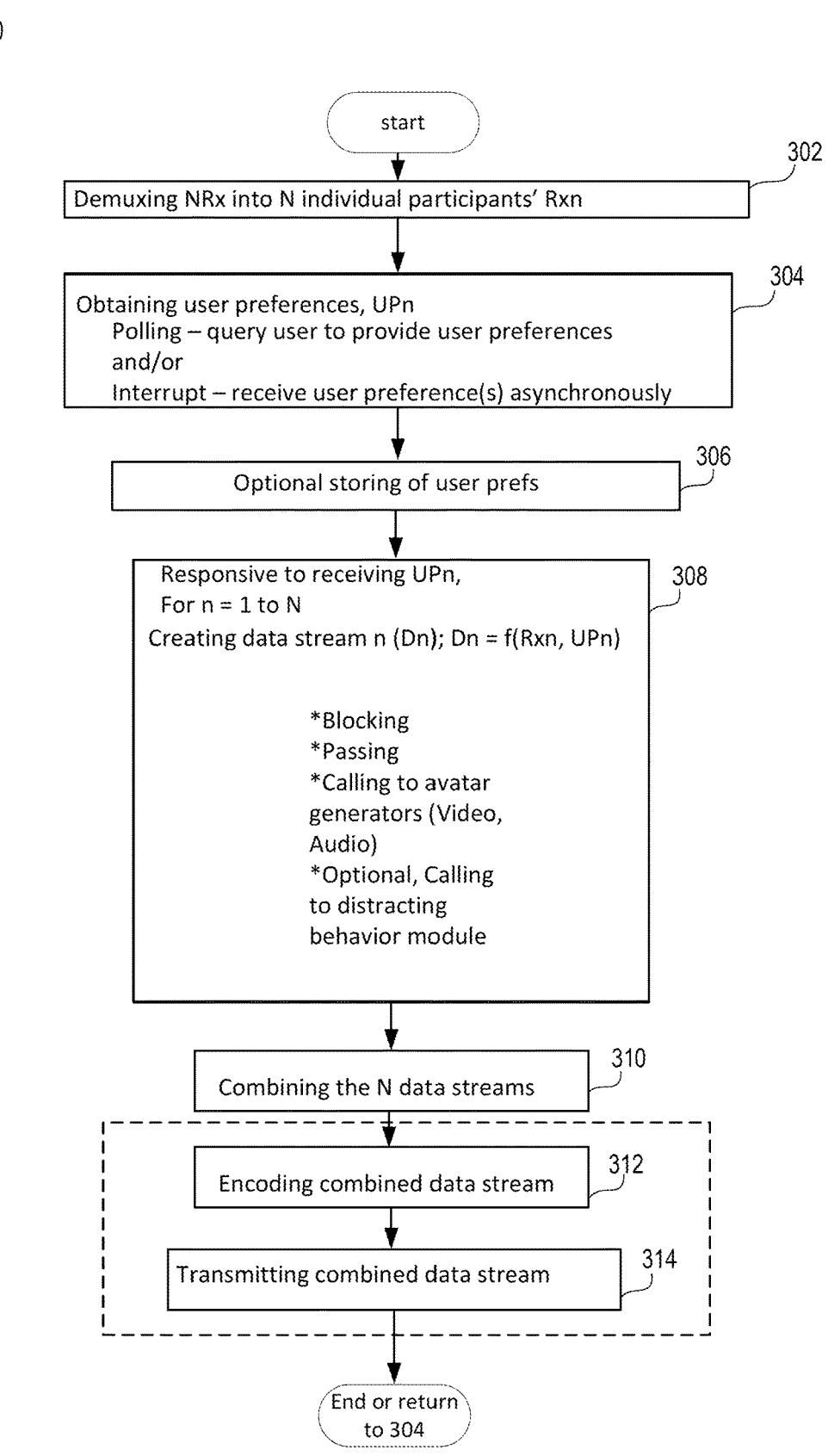

300 start

302
Demuxing NRx into N individual participants' Rxn

304
Obtaining user preferences, UPn
    Polling – query user to provide user preferences
    and/or
    Interrupt – receive user preference(s) asynchronously 306
Optional storing of user prefs 308
Responsive to receiving UPn,
For n = 1 to N
Creating data stream n (Dn); Dn = f(Rxn, UPn)

*Blocking
*Passing
*Calling to avatar
generators (Video,
Audio)
*Optional, Calling
to distracting
behavior module 310
Combining the N data streams 312
Encoding combined data stream 314
Transmitting combined data stream End or return
to 304

FIG. 3

400
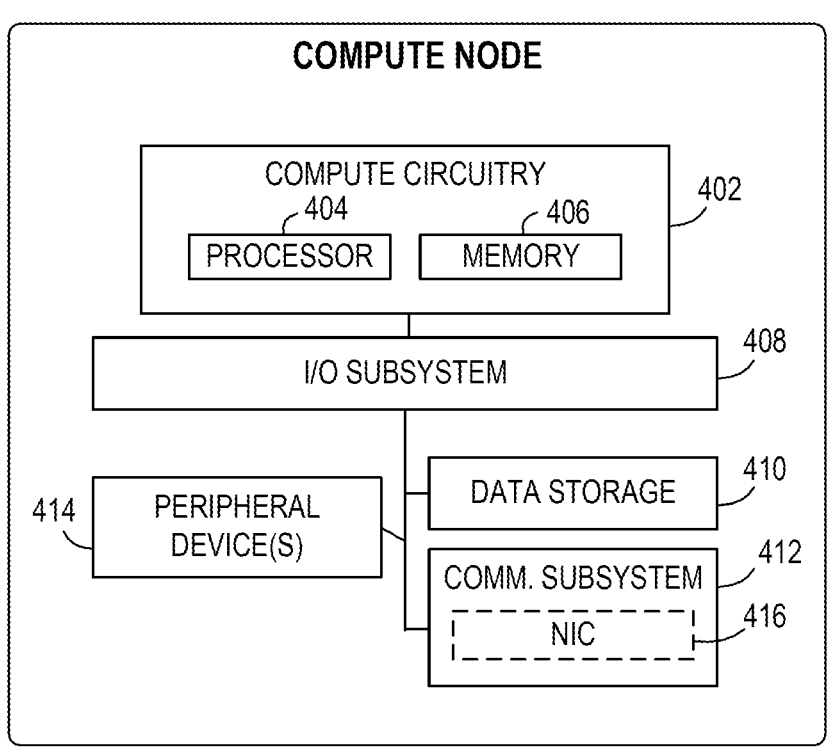
FIG. 4

FIG. 5

SYSTEMS AND METHODS FOR RECEIVE-SIDE CUSTOMIZATION OF PRESENTATION OF MIXED MEDIA DATA

BACKGROUND

There has been an increasing reliance on mixed media applications, such as video conference applications and video chat applications, for communication between individuals and among groups of participants. Continued improvements to the user experience during operation of these applications are desirable.

BRIEF DESCRIPTION OF THE DRAWINGS

FIG. 3 provides a flow chart depicting an example method for receive-side customization of presentation of mixed media data, in accordance with various embodiments.

FIG. 4 is a block diagram of an example compute node that may include any of the embodiments disclosed herein.

FIG. 5 illustrates a multi-processor environment in which embodiments may be implemented.

DETAILED DESCRIPTION

Figure 1:
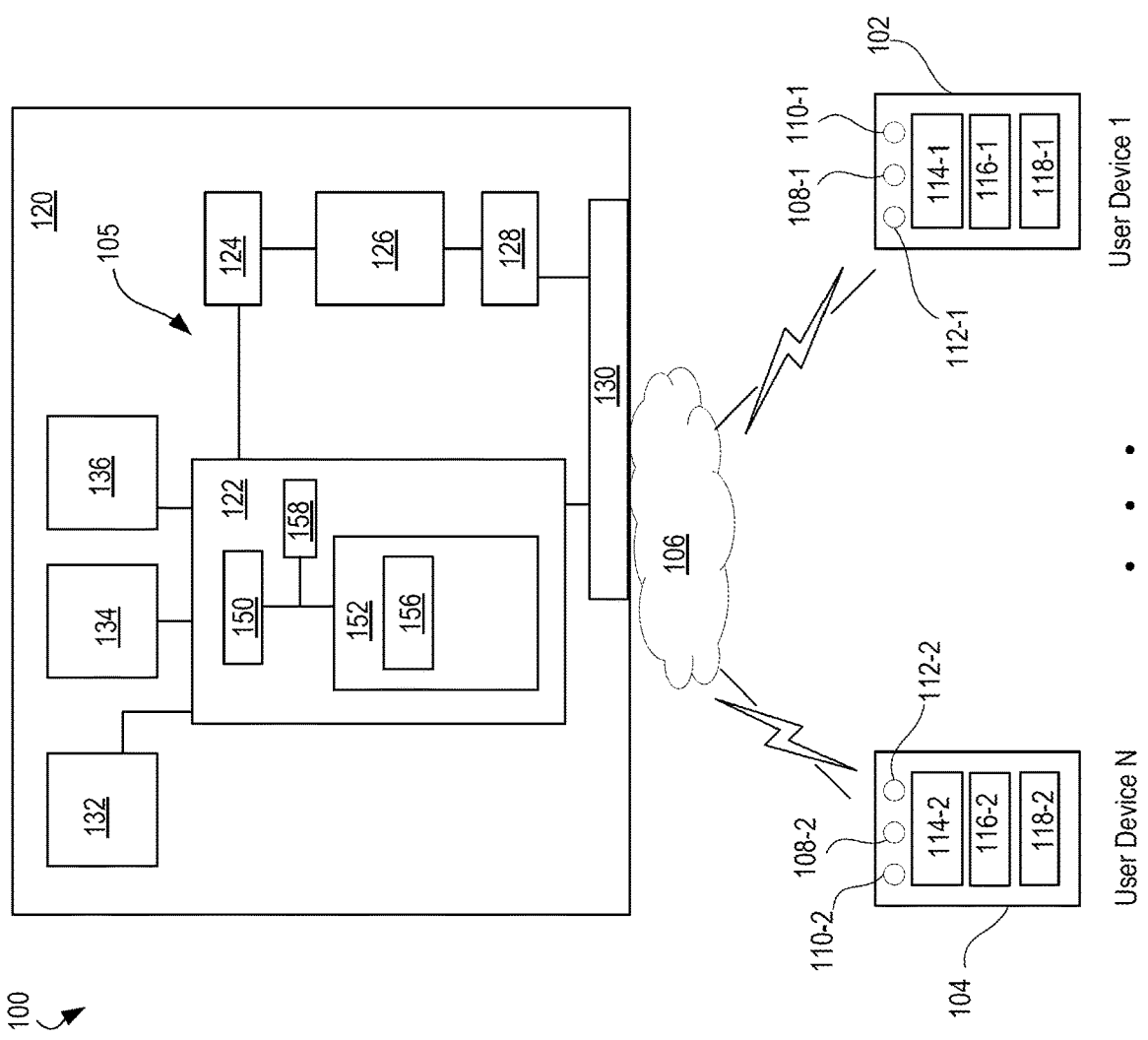
FIG. 1 is a schematic diagram illustrating an environment in which embodiments of the disclosure may be implemented.

Mixed media applications, such as video conference applications and video chat applications, often combine video, audio, images (such as profile pictures) and computer-generated images. Over time, these applications have increasingly been employed for communication between individuals and among groups. Many available applications focus on the transmit path, allowing a sender to replace a video with an avatar, for example. However, a technical problem is presented, in that receive-side users do not have the ability to manage the receive-side of the mixed media presentation.

Some solutions provide an ability on the receive-side to enable/disable all data streams, replacing them with profile pictures. However, this all-or-nothing solution can result in a negative receive-side user experience, cutting off valuable video information from all participants just to address a single participant. It is desirable to provide a more inclusive user experience. Receive-side users may have different sensitivities and/or sensory overload thresholds and could benefit from an ability to enable/disable individual streams or replace individual streams with avatars.

Aspects of the present disclosure provide a technical solution to this technical problem and other related enhancements, in the form of systems and methods for receive-side customization of presentation of mixed media data. Provided embodiments advantageously focus on the receive path where each user/participant can enable/disable and/or customize individual incoming streams. Embodiments enable all participating users (not just a host user) to customize their receive-side mixed media presentation with preferences for individual video streams. Embodiments enable an organization to restrict available avatars to a pre-approved list. Additionally, embodiments can be implemented in an existing server.

Embodiments may be detected by reviewing mixed media application documentation to look for instructions for disabling individual participants' video streams and enabling customized avatars, per participant, and by viewing options available during operation of a video conference application (including Web and native Operating System applications). The feature of enabling an organization to restrict available avatars to a pre-approved list can also be detected in the product literature or operation.

As used herein, the terms "processor unit," "processing circuitry," "processing unit," or "processor" may refer to any device or portion of a device that processes electronic data from registers and/or memory to transform that electronic data into other electronic data that may be stored in registers and/or memory. A processor unit may be a system-on-a-chip (SOC), and/or include one or more digital signal processors (DSPs), application-specific integrated circuits (ASICs), central processing units (CPUs), graphics processing units (GPUs), general-purpose GPUs (GPGPUs), accelerated processing units (APUs), field-programmable gate arrays (FPGAs), neural network processing units (NPUs), data processor units (DPUs), accelerators (e.g., graphics accelerator, compression accelerator, artificial intelligence accelerator), controller cryptoprocessors (specialized processors that execute cryptographic algorithms within hardware), server processors, controllers, or any other suitable type of processor units. As such, the processor unit can be referred to as an XPU (or xPU).

As used herein, the term "module" may refer to any hardware, software, firmware, electronic control component, processing logic, and/or processor device, individually or in any combination. In various embodiments, a module is one or more of: an application specific integrated circuit (ASIC), a field-programmable gate-array (FPGA), an electronic circuit, a computer system comprising a processor (shared, dedicated, or group) and memory that executes one or more software or firmware programs, a combinational logic circuit, and/or other suitable components that provide the functionality attributed to the module.

For the sake of brevity, conventional techniques related to signal processing, data transmission, signaling, control, artificial intelligence (AI) models, machine learning models, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Embodiments of the present disclosure may be described herein in terms of functional and/or logical block components that perform different actions or tasks. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices.

As mentioned, media applications that consume and process audio, video, and images, such as, video conference applications and video chat applications, can provide an improved user experience when using embodiments described herein. The technologically enhanced systems and methods for receive-side customization of presentation of mixed media data are described in more detail in connection with the figures below.

FIG. 1 is a schematic diagram depicting an example environment 100 in which embodiments may be implemented. A plurality of user devices, represented as user device 1 to user device N (N>1), may be communicatively coupled to one another via a network 106. A variety of different transmission protocols and architectures may be utilized in the network 106 and in support of the bidirectional communication between the user devices, such as, but not limited to, wireless, WIFI, 2G, 3G, 4G, 5G, etc.

The user devices are capable of transmitting and receiving media data comprising at least audio, video, and images; and, the user devices are configured, such as, with an installed device application, to run at least one media application that consumes and processes audio, video, and images. Some example media applications include video conference applications and video chat applications. Accordingly, the user devices generally include at least a camera (108-1, 108-2), a speaker 110-1, 110-2, a microphone 112-1, 112-2, a display 114-1, 114-2, a user input device 116-1, 116-2 (e.g., a keyboard or touch screen), and a communication system 118-1, 118-2 that supports communication via the network 106.

Although the user devices are drawn alike, in practice, they can be any combination of available computing devices that meet the above criteria. For example, the user devices can comprise any combination of laptop computers, desktop computers, kiosks, and cellular phones.

In various aspects of the disclosure, the network 106 includes a cloud server 120. The server 120 may include at least one or more of an avatar database (ADB) 132, avatar video-based generator (AVG) 134, avatar audio-based generator (AAG) 136, demultiplexing system (demux) 124, video encoding system 126, encoding system 128, and communication system 130. Other components, not shown to avoid clutter, may also be included in the server 120. A system for receive-side customization of presentation of mixed media data, shown generally as system 105, includes control circuit 122.

In various embodiments, the control circuit 122 is communicatively coupled to systems and components within the server 120, as illustrated. In operation, the system 105 may receive mixed media data signals Rx, receive user preferences, process the data signals Rx with the user preferences, as described herein, generate therefrom a data output that is receive-side customized, and transmit the data output to the user's device. As may be appreciated, for multiple users, the system 105 is to concurrently perform these operations such that every user is receiving respective receive-side customized data.

In various embodiments, as shown in FIG. 1, the control circuit 122 is realized as an enhanced computer system, comprising computer readable storage device or media, memory 152, for storage of instructions, algorithms, and/or programs, such as program 156 and a plurality of preprogrammed thresholds and parameters, the processor 150 to execute the program 156, and input/output interface (I/O) 158. The computer readable storage device or media, memory 152, may include volatile and nonvolatile storage in read-only memory (ROM), random-access memory (RAM), and keep-alive memory (KAM), for example. KAM is a persistent or non-volatile memory that may be used to store various operating variables while the processor 150 is powered down. The memory 152 may be implemented using any of several known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processor 150 in other aspects of server 120 operation. In various embodiments, processor 150 is to implement the system 105. The memory 152 may also be utilized by the processor 150 to cache data, to temporarily store results of comparisons and analyses, and the like. Information in the memory 152 may be organized and/or imported from an external source during an initialization or installment operation in a method; it may also be programmed via a user I/O interface.

The input/output interface (I/O) 158 may be operationally coupled to the processor 150 via a bus and enables intra-circuit 122 communication as well as extra-circuit 122 communication. The input/output interface (I/O) 158 may include one or more wired and/or wireless network interfaces and can be implemented using any suitable method and apparatus. In various embodiments, the input/output interface (I/O) 158 includes the hardware and software to support one or more communication protocols for wireless communication between the processor 150 and external sources, such as satellites, processing systems in the cloud, communication towers and ground stations. In various embodiments, the input/output interface (I/O) 158 supports communication with technicians, and/or one or more storage interfaces for direct connection to storage apparatuses.

During operation of the system 105, the processor 150 loads and executes one or more algorithms, instructions, and rules embodied as program 156, and, as such, controls the general operation of the system 105. During operation of the system 105, the processor 150 may receive data from external sources via the communication system 130. In various embodiments of the system 105, the control circuit 122 may: perform operations attributed to the system 105 in accordance with an algorithm; perform operations in accordance with state machine logic; and perform operations in accordance with logic in a programmable logic array.

While the exemplary embodiment of the system 105 is described in the context of the control circuit 122 implemented as a fully functioning enhanced computer system, those skilled in the art will recognize that the mechanisms of the present disclosure are capable of being distributed as computer-executable instructions or a computer program product (e.g., program 156) and predefined parameters. Such a program product may comprise an arrangement of instructions organized as multiple interdependent program code modules, each configured to achieve a separate process and/or perform a separate algorithmic operation, arranged to manage data flow through the system 105. The program code modules may each comprise an ordered listing of executable instructions or rules for implementing logical functions for the processes performed by the system 105. The instructions in the program code modules, when executed by a processor (e.g., processor 150), cause the processor to receive and process signals, and perform logic, calculations, methods and/or algorithms as described herein. Such a program product may take a variety of forms, and the present disclosure applies equally regardless of the type of computer-readable signal bearing media used to carry out the distribution.

With continued reference to FIG. 1, exemplary application process modules of the system 105 are described in connection with FIG. 2, and an exemplary method 300 for operating the system 105 is described in connection with FIG. 3.

In the following description, the first user device 102 is designated as a reference device or receive-side device, to distinguish it from a plurality of other user's devices participating in a mixed media application or conference call. The receive-side user's preferences are referred to as either receive-side user preferences, or simply, the user preferences, as this is the focus of the disclosure. Those with skill in the art will recognize that an incoming mixed media data (Rxn) signal associated with another user may reflect send-side preferences that are overridden by receive-side user's preferences. It may be appreciated that, in operation, the techniques and methods described for the receive-side user may be employed for every user participating in the conference call or mixed media application.

Figure 2:
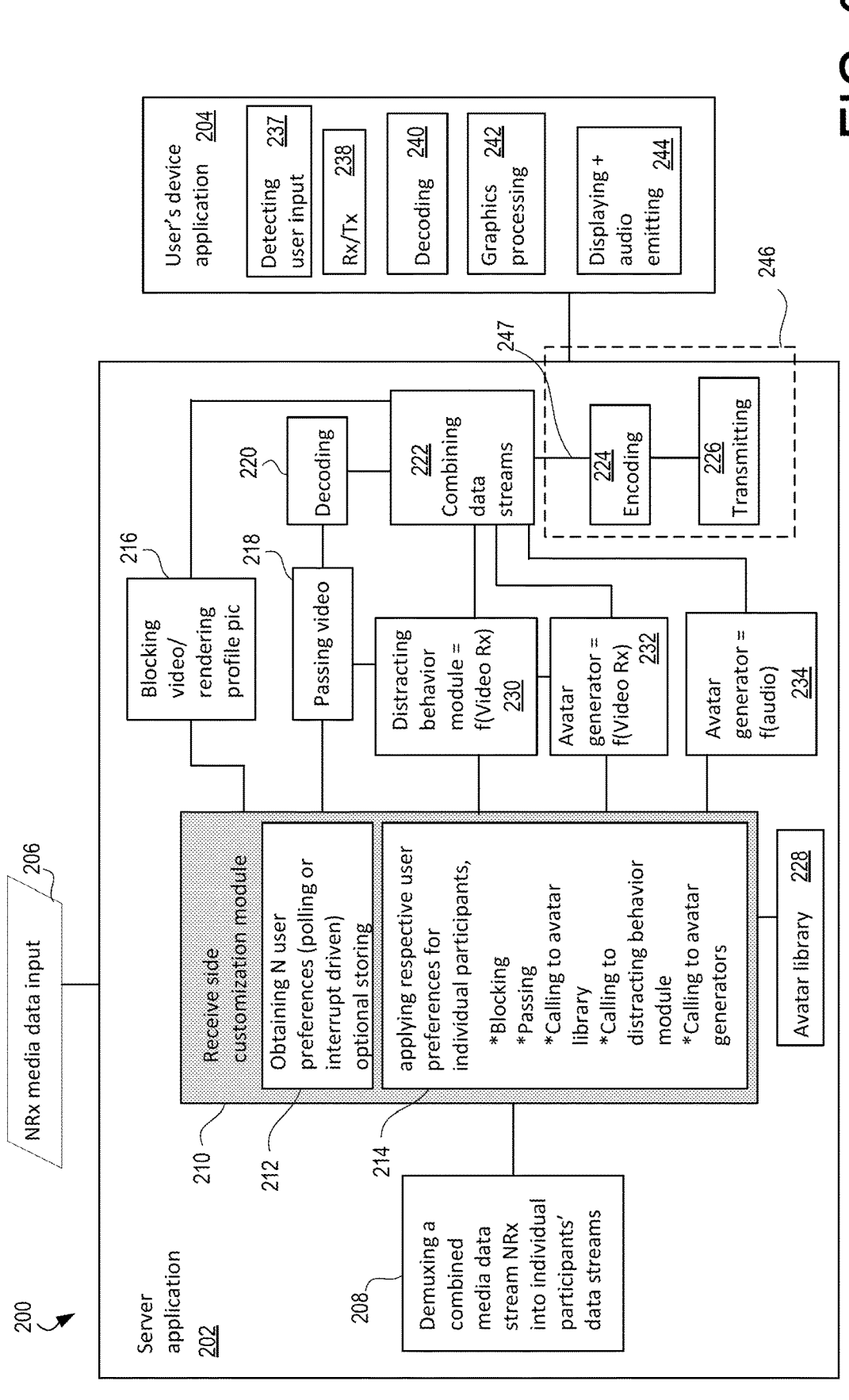
FIG. 2 is an architectural block diagram of one or more application modules that may be operating in a system for receive-side customization of presentation of mixed media data.

FIG. 2 provides at least two different organizations for application process modules in the system 105. In a first organizational view shown in embodiment 200, the system 105 includes operations performed by a server application 202 module attributed to server 120 and operations performed by a device application 204 module; the modules communicatively coupled together (e.g., via the network 106), as indicated. Either of the server application 202 module and device application 204 module may be part of a larger application, such as a video conference call application. In an application, each application module may be realized as one or more sub-modules, and the modules and sub-modules may be distributed among and between various server 120 and/or device systems and components. There are N user devices (i.e., first user device 102 through N user device 104) in operational communication with the server application 202, providing NRx data input 206. The N user devices are also referred to as external devices. The NRx are mixed media data signals.

In a second organizational view shown in embodiment 200, one or more of the application modules 201 through 222 attributed to the server application 202 module in the server 120 in FIG. 1 may instead be located at the receive-side device, and be part of the device application 204 module, communicatively coupled to the server 120 (e.g., via the network 106). In the second organizational view, the modules 246 within the dashed box may be omitted, as the transmission of the data streams Dn across the network 106 is not necessary.

For illustrative purposes, the following description of method 300 may refer to elements mentioned above in connection with FIGS. 1-2. In various embodiments, portions of method 300 may be performed by different components of the described system 105. It should be appreciated that method 300 may include any number of additional or alternative operations and tasks, the tasks shown in FIG. 3 need not be performed in the illustrated order, and method 300 may be incorporated into a more comprehensive procedure or method, such as a video conference call application, having additional functionality not described in detail herein. Moreover, one or more of the tasks shown in FIG. 3 could be omitted from an embodiment of the method 300 if the intended overall functionality remains intact.

A demultiplexing (demuxing) module 208 in the server 120 receives NRx data input 206, which is a combined media stream (i.e., combined mixed media data signals) that includes video signals, audio signals, and images or profile pictures for N users (the N users do not include duplicate users) via their respective user devices. At 302, the demuxing module 208 sorts the NRx signal into its N constituent data streams, Rxn. In various embodiments, a receive-side customization module 210 receives and operates on the Rxn. In other embodiments, the receive-side customization module 210 is a means for receive-side customization.

At 304, the receive-side customization module 210, or means for receive-side customization, receives user preferences from the device application 204 module at the receive-side user device. The user preference is to customize one or more of the Rxn signals. The user preferences include, for the N users, a respective preference UPn. Stated differently, at 304, the system 105 receives user preferences (UPn) for n=1 to n=N. Obtaining the user preferences 212 can be achieved in a various ways. In a first example, at the start of a conference call, the receive-side user may be prompted or polled to provide user preferences N*UPn. Prompting may include generating a prompt on the reference device or displaying a graphical user interface (GUI) on the reference device that includes the N users and available customization options and determining user selections and responding to user selections based thereon. In a second example, receiving the N*UPn may be interrupt driven. In an interrupt driven scenario, the system 105 may be set to a default, such as, passing all video streams Rxn, until and unless the receive-side user interrupts the conference call operations by asserting a user preference UPn to customize a Rxn.

Non-limiting examples of the user preference options 214 include:

Blocking—blocking (at blocking module 216) reflects a receive-side user preference to prevent the user's video stream from being displayed on the receive-side device. Blocking is achieved by not passing the video stream to the combining module 222. Instead, the module 210 passes the user's audio signal and the user's image or profile picture as the user's data stream (Dn) to the combining module 222. Using a blocking preference, especially when applied to multiple data streams, can advantageously reduce power consumption on the receive-side device because blocking the device means that the received data stream doesn't get passed to the combining module 222 and therefore less computational demands are made on the combining module 222. And, the combining module 222 can be in the reference user's device, as part of the user's device application 204.

Passing—passing allows the user's video and audio stream to be displayed on the receive-side device. Passing is achieved (passing video module 218) by passing the user's video Rxn to a decoder module 220 and from the decoder module 220 to the combining module 222, as the user's data stream Dn.

Converting—calling avatar generators—This reflects a receive-side user preference to convert an incoming video signal to an avatar data stream Dn. Alternately, this may be a user preference to convert an incoming audio signal to an avatar data stream Dn. Additionally, an avatar data stream can be a video, a 3D object (gITF file format) or motion detector input. Accordingly, calling to avatar generators may be further subdivided into calling to an audio avatar generator 234 and calling to a video avatar generator 232. As mentioned, the avatar generators are available modules on-board the server 120; the avatar modules may employ artificial intelligence (AI) or other machine learning techniques. Calling to an avatar generator includes a call to the avatar library 228 to apply the user's preferred avatar.

The video avatar generator 232 converts the user's video signal into an avatar video (e.g., by first mapping face, eyes, mouth, body, etc., and monitoring motion thereof), and the audio avatar generator 234 converts the user's audio signal into an audio avatar data stream or video (e.g., by mapping sounds in the audio signal to mouth motions). It may be appreciated that the user's audio signal may come from an audio signal (such as, when a user has called in from a telephone and is not using a camera) or the user's audio signal may be parsed from the user's video signal. The output from the video avatar generator 232 and the output from the audio avatar generator 234 is passed as the user's data stream Dn to the combining module 222.

Filtering—Calling a distracting behavior module 230—In some scenarios, a user may be performing distracting behavior while in a video conference call. Some examples of distracting behavior include eating, exercising, and having other individuals in the background. The distracting behavior module 230 is another example of an available module in the server 120 that can be employed to execute an algorithm to remove the distracting behavior from video signals; therefore, it may operate on video signals from passing video module 218 and video signals from the video avatar generator 232. Depending on the algorithm implemented by the distracting behavior module 230, the user's video may be replaced with the user's image or profile picture, the user's background may be blurred, or AI may be used to alter a portion of the user's video stream, such as, by rendering the user's arms/hands as being still.

The user preferences (UPn) for n=1 to n=N may optionally be stored at 306. Storing user preferences can be temporary, such as, for the duration of the video conference, or may embody default settings that the receive-side user returns to for multiple different video conferences.

At 308, the system 105 converts the received data stream into a customized data stream Dn for the recipient device, wherein the customized data stream is responsive to received user preferences. E.g., responsive to receiving the user preferences N*UPn, the system 105 creates respective data stream(s) (Dn) for n=1 to n=N, as described above. Customized data streams can include video, 3d object (glTF files), or motion vectors. Customized data streams are passed to the combining module 222, blocked data streams are not.

At 310 the N data streams Dn which are receive-side customized are combined at the combining module 222. Note that power consumption at this stage may be reduced because blocked video streams are not processed in the combining module 222; this translates into less data and fewer operations to perform.

Depending on whether the system 105 is server 120 based or receive-side device based, the customized data streams that make up created signals 247 may or may not be encoded and transmitted (module 246) externally. If the system 105 is receive-side device based, the operations of module 246 are omitted and created signals 247 can be composited at a graphics processing module 242 onboard the receive-side device and displayed/emitted at the receive-side device by module 244. If the system 105 is server 120 based, output from the combining module 222 (created signals 247) may be encoded by the encoding module 224 at 312. The encoded combined data stream may be transmitted by the transmitting module 226 to the user's device application 204 on receive-side device at 314.

After 314, the method may end or return to obtaining user preferences 304 and generating data streams Dn until the conference call ends. After either 310 or 314, the receive-side device has obtained the created signals 247, comprising one or more converted data streams Dn, and can proceed to process and display/emit the receive-side customized data streams as described herein.

At the receive-side device, a displaying an audio emitting module 244 can present the video conference call for the receive-side user. As may be appreciated, in support of the actions and tasks described herein, the device application 204 module may also include a user input detection module 237, as may be associated with a keyboard or touchscreen, a transmit/receive module 238 to communicate over the network 106, a decoding module 240 associated with the encoding module 224 and the graphics processing (compositing) module 242 to generate and drive the displaying an audio emitting module 244.

Thus, systems and methods for receive-side customization of presentation of mixed media data have been provided. Embodiments advantageously improve the user's experience during conference calls and other mixed media applications. Aspects of the disclosure allow users to reduce sensory information to improve their ability to focus, enable users to customize the presentation of media during mixed media applications, allow users to remove distractions from other participants' video streams, and can increase battery life by reducing power and network bandwidth by way of blocking video streams.

The following additional figures and description are intended to illustrate various contexts for usage and application of the present disclosure.

Disclosed embodiments may be implemented in a compute node. In the simplified example depicted in FIG. 4, a compute node 400 includes a compute engine (referred to herein as "compute circuitry") 402, an input/output (I/O) subsystem 408, data storage 410, a communication circuitry subsystem 412, and, optionally, one or more peripheral devices 414. With respect to the present example, the compute node 400 or compute circuitry 402 may perform the operations and tasks attributed to the system 105. In other examples, respective compute nodes 400 may include other or additional components, such as those typically found in a computer (e.g., a display, peripheral devices, etc.). Additionally, in some examples, one or more of the illustrative components may be incorporated in, or otherwise form a portion of, another component.

In some examples, the compute node 400 may be embodied as a single device such as an integrated circuit, an embedded system, a field-programmable gate array (FPGA), a system-on-a-chip (SOC), or other integrated system or device. In the illustrative example, the compute node 400 includes or is embodied as a processor 404 and a memory 406. The processor 404 may be embodied as any type of processor capable of performing the functions described herein (e.g., executing compile functions and executing an application). For example, the processor 404 may be embodied as a multi-core processor(s), a microcontroller, a processing unit, a specialized or special purpose processing unit, or other processor or processing/controlling circuit.

In some examples, the processor 404 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 404 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing, or managing server or data center hardware, managing service meshes, or collecting and distributing telemetry), outside of the CPU or general-purpose processing hardware. However, it will be understood that a xPU, a SOC, a CPU, and other variations of the processor 404 may work in coordination with each other to execute many types of operations and instructions within and on behalf of the compute node 400.

The memory 406 may be embodied as any type of volatile (e.g., dynamic random-access memory (DRAM), etc.) or non-volatile memory or data storage capable of performing the functions described herein. Volatile memory may be a storage media that requires power to maintain the state of data stored by the media. Non-limiting examples of volatile memory may include various types of random-access memory (RAM), such as DRAM or static random-access memory (SRAM). One type of DRAM that may be used in a memory module is synchronous dynamic random-access memory (SDRAM).

In an example, the memory device is a block addressable memory device, such as those based on NAND or NOR technologies. A memory device may also include a three-dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 406 may be integrated into the processor 404. The memory 406 may store various software and data used during operation such as one or more applications, data operated on by the application(s), libraries, and drivers.

The compute circuitry 402 is communicatively coupled to other components of the compute node 400 via the I/O subsystem 408, which may be embodied as circuitry and/or components to facilitate input/output operations with the compute circuitry 402 (e.g., with the processor 404 and/or the main memory 406) and other components of the compute circuitry 402. For example, the I/O subsystem 408 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 408 may form a portion of a system-on-a-chip (SoC) and be incorporated, along with one or more of the processor 404, the memory 406, and other components of the compute circuitry 402, into the compute circuitry 402.

The one or more illustrative data storage devices 410 may be embodied as any type of devices configured for short-term or long-term storage of data such as, for example, memory devices and circuits, memory cards, hard disk drives, solid-state drives, or other data storage devices. Individual data storage devices 410 may include a system partition that stores data and firmware code for the data storage device 410. Individual data storage devices 410 may also include one or more operating system partitions that store data files and executables for operating systems depending on, for example, the type of compute node 400.

The communication subsystem 412 may be embodied as any communication circuit, device, transceiver circuit, or collection thereof, capable of enabling communications over a network between the compute circuitry 402 and another computing device (e.g., an edge gateway of an implementing edge computing system).

The communication subsystem 412 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra-mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication subsystem 412 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication subsystem 412 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication subsystem 412 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication subsystem 412 may operate in accordance with other wireless protocols in other embodiments. The communication subsystem 412 may include an antenna to facilitate wireless communications and/or to receive other wireless communications (such as AM or FM radio transmissions).

In some embodiments, the communication subsystem 412 may manage wired communications, such as electrical, optical, or any other suitable communication protocols (e.g., IEEE 802.3 Ethernet standards). As noted above, the communication subsystem 412 may include multiple communication components. For instance, a first communication subsystem 412 may be dedicated to shorter-range wireless communications such as Wi-Fi or Bluetooth, and a second communication subsystem 412 may be dedicated to longer-range wireless communications such as global positioning system (GPS), EDGE, GPRS, CDMA, WiMAX, LTE, EV-DO, or others. In some embodiments, a first communication subsystem 412 may be dedicated to wireless communications, and a second communication subsystem 412 may be dedicated to wired communications.

The illustrative communication subsystem 412 includes an optional network interface controller (NIC) 416, which may also be referred to as a host fabric interface (HFI). The NIC 416 may be embodied as one or more add-in-boards, daughter cards, network interface cards, controller chips, chipsets, or other devices that may be used by the compute node 400 to connect with another computing device (e.g., an edge gateway node). In some examples, the NIC 416 may be embodied as part of a system-on-a-chip (SoC) that includes one or more processors or included on a multichip package that also contains one or more processors. In some examples, the NIC 416 may include a local processor (not shown) and/or a local memory (not shown) that are both local to the NIC 416. In such examples, the local processor of the NIC 416 may be capable of performing one or more of the functions of the compute circuitry 402 described herein. Additionally, or alternatively, in such examples, the local memory of the NIC 416 may be integrated into one or more components of the client compute node at the board level, socket level, chip level, and/or other levels.

Additionally, in some examples, a respective compute node 400 may include one or more peripheral devices 414. Such peripheral devices 414 may include any type of peripheral device found in a computing device or server such as audio input devices, a display, other input/output devices, interface devices, and/or other peripheral devices, depending on the particular type of the compute node 400. In further examples, the compute node 400 may be embodied by a respective edge compute node (whether a client, gateway, or aggregation node) in an edge computing system or like forms of appliances, computers, subsystems, circuitry, or other components.

In other examples, the compute node 400 may be embodied as any type of device or collection of devices capable of performing various compute functions. Respective compute nodes 400 may be embodied as a type of device, appliance, computer, or other "thing" capable of communicating with other compute nodes that may be edge, networking, or endpoint components. For example, a compute node may be embodied as a personal computer, server, smartphone, a mobile computing device, a smart appliance, smart camera, an in-vehicle compute system (e.g., a navigation system), a weatherproof or weather-sealed computing appliance, a self-contained device within an outer case, shell, etc., or other device or system capable of performing the described functions.

Figure 5:
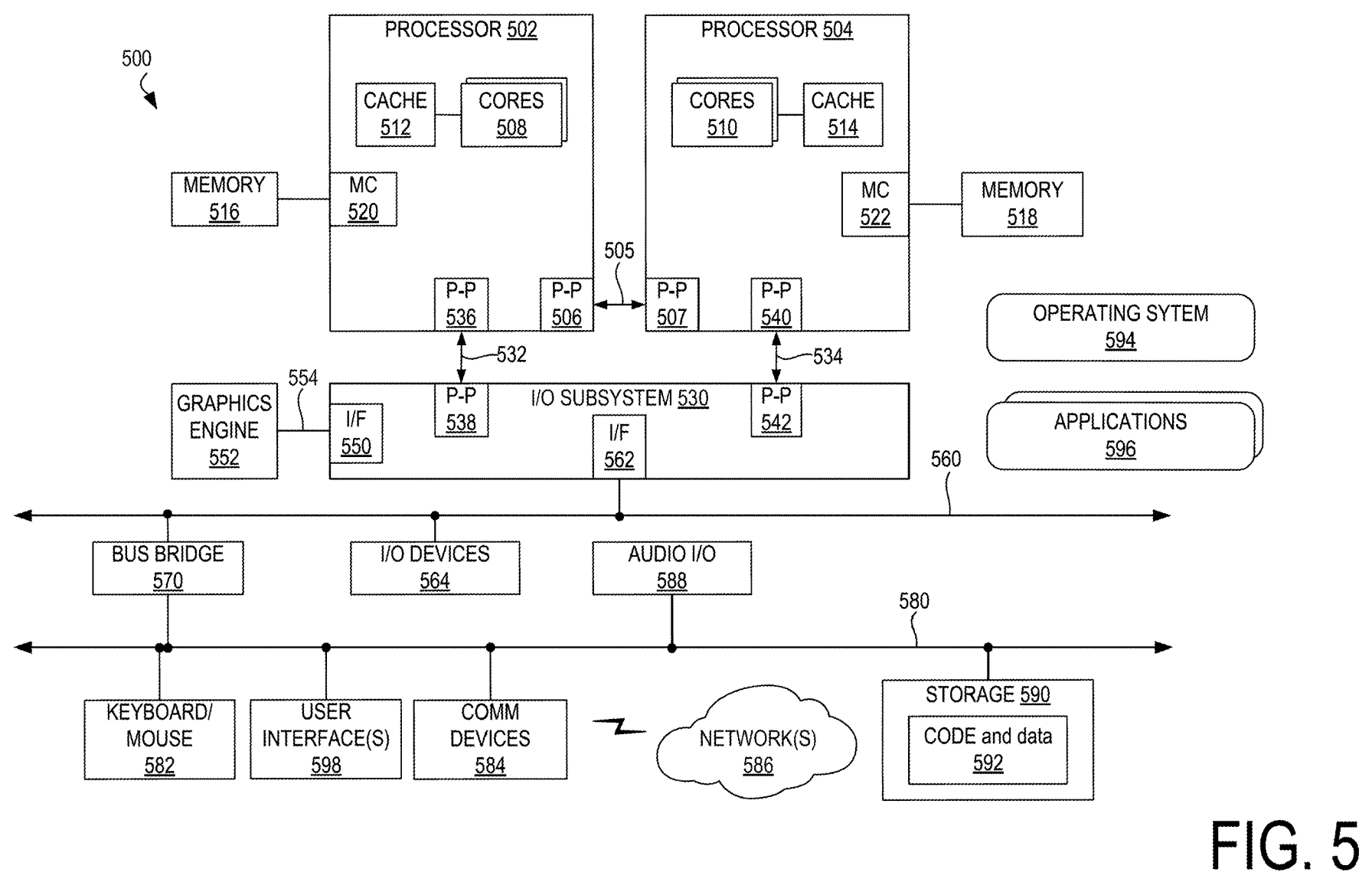

FIG. 5 illustrates a multi-processor environment in which embodiments may be implemented. Processor units 502 and 504 further comprise cache memories 512 and 514, respectively. The cache memories 512 and 514 can store data (e.g., instructions) utilized by one or more components of the processor units 502 and 504, such as the processor cores 508 and 510. The cache memories 512 and 514 can be part of a memory hierarchy for the computing system 500. For example, the cache memories 512 can locally store data that is also stored in a memory 516 to allow for faster access to the data by the processor unit 502. In some embodiments, the cache memories 512 and 514 can comprise multiple cache levels, such as level 1 (L1), level 2 (L2), level 3 (L3), level 4 (L4) and/or other caches or cache levels. In some embodiments, one or more levels of cache memory (e.g., L2, L3, L4) can be shared among multiple cores in a processor unit or among multiple processor units in an integrated circuit component. In some embodiments, the last level of cache memory on an integrated circuit component can be referred to as a last level cache (LLC). One or more of the higher levels of cache levels (the smaller and faster caches) in the memory hierarchy can be located on the same integrated circuit die as a processor core and one or more of the lower cache levels (the larger and slower caches) can be located on an integrated circuit dies that are physically separate from the processor core integrated circuit dies.

Although the computing system 500 is shown with two processor units, the computing system 500 can comprise any number of processor units. Further, a processor unit can comprise any number of processor cores. A processor unit can take various forms such as a central processing unit (CPU), a graphics processing unit (GPU), general-purpose GPU (GPGPU), accelerated processing unit (APU), field-programmable gate array (FPGA), neural network processing unit (NPU), data processor unit (DPU), accelerator (e.g., graphics accelerator, digital signal processor (DSP), compression accelerator, artificial intelligence (AI) accelerator), controller, or other types of processing units. As such, the processor unit can be referred to as an XPU (or xPU). Further, a processor unit can comprise one or more of these various types of processing units. In some embodiments, the computing system comprises one processor unit with multiple cores, and in other embodiments, the computing system comprises a single processor unit with a single core. As used herein, the terms "processor unit" and "processing unit" can refer to any processor, processor core, component, module, engine, circuitry, or any other processing element described or referenced herein.

In some embodiments, the computing system 500 can comprise one or more processor units that are heterogeneous or asymmetric to another processor unit in the computing system. There can be a variety of differences between the processing units in a system in terms of a spectrum of metrics of merit including architectural, microarchitectural, thermal, power consumption characteristics, and the like. These differences can effectively manifest themselves as asymmetry and heterogeneity among the processor units in a system.

The processor units 502 and 504 can be located in a single integrated circuit component (such as a multi-chip package (MCP) or multi-chip module (MCM)) or they can be located in separate integrated circuit components. An integrated circuit component comprising one or more processor units can comprise additional components, such as embedded DRAM, stacked high bandwidth memory (HBM), shared cache memories (e.g., L3, L4, LLC), input/output (I/O) controllers, or memory controllers. Any of the additional components can be located on the same integrated circuit die as a processor unit, or on one or more integrated circuit dies separate from the integrated circuit dies comprising the processor units. In some embodiments, these separate integrated circuit dies can be referred to as "chiplets". In some embodiments where there is heterogeneity or asymmetry among processor units in a computing system, the heterogeneity or asymmetric can be among processor units located in the same integrated circuit component. In embodiments where an integrated circuit component comprises multiple integrated circuit dies, interconnections between dies can be provided by the package substrate, one or more silicon interposers, one or more silicon bridges embedded in the package substrate (such as Intel@embedded multi-die interconnect bridges (EMIBs)), or combinations thereof.

Processor units 502 and 504 further comprise memory controller logic (MC) 520 and 522. As shown in FIG. 5, MCs 520 and 522 control memories 516 and 518 coupled to the processor units 502 and 504, respectively. The memories 516 and 518 can comprise various types of volatile memory (e.g., dynamic random-access memory (DRAM), static random-access memory (SRAM)) and/or non-volatile memory (e.g., flash memory, chalcogenide-based phase-change non-volatile memories), and comprise one or more layers of the memory hierarchy of the computing system. While MCs 520 and 522 are illustrated as being integrated into the processor units 502 and 504, in alternative embodiments, the MCs can be external to a processor unit.

Processor units 502 and 504 are coupled to an Input/ Output (I/O) subsystem 530 via point-to-point interconnections 532 and 534. The point-to-point interconnection 532 connects a point-to-point interface 536 of the processor unit 502 with a point-to-point interface 538 of the I/O subsystem 530, and the point-to-point interconnection 534 connects a point-to-point interface 540 of the processor unit 504 with a point-to-point interface 542 of the I/O subsystem 530. Input/Output subsystem 530 further includes an interface 550 to couple the I/O subsystem 530 to a graphics engine 552. The I/O subsystem 530 and the graphics engine 552 are coupled via a bus 554.

The Input/Output subsystem 530 is further coupled to a first bus 560 via an interface 562. The first bus 560 can be a Peripheral Component Interconnect Express (PCIe) bus or any other type of bus. Various I/O devices 564 can be coupled to the first bus 560. A bus bridge 570 can couple the first bus 560 to a second bus 580. In some embodiments, the second bus 580 can be a low pin count (LPC) bus. Various devices can be coupled to the second bus 580 including, for example, a keyboard/mouse 582, audio I/O devices 588, and a storage device 590, such as a hard disk drive, solid-state drive, or another storage device for storing computer-executable instructions (code) 592 or data. The code 592 can comprise computer-executable instructions for performing methods described herein. Additional components that can be coupled to the second bus 580 include communication device(s) 584, which can provide for communication between the computing system 500 and one or more wired or wireless networks 586 (e.g. Wi-Fi, cellular, or satellite networks) via one or more wired or wireless communication links (e.g., wire, cable, Ethernet connection, radio-frequency (RF) channel, infrared channel, Wi-Fi channel) using one or more communication standards (e.g., IEEE 802.11 standard and its supplements).

In embodiments where the communication devices 584 support wireless communication, the communication devices 584 can comprise wireless communication components coupled to one or more antennas to support communication between the computing system 500 and external devices. The wireless communication components can support various wireless communication protocols and technologies such as Near Field Communication (NFC), IEEE 802.11 (Wi-Fi) variants, WiMax, Bluetooth, Zigbee, 4G Long Term Evolution (LTE), Code Division Multiplexing Access (CDMA), Universal Mobile Telecommunication System (UMTS) and Global System for Mobile Telecommunication (GSM), and 5G broadband cellular technologies. In addition, the wireless modems can support communication with one or more cellular networks for data and voice communications within a single cellular network, between cellular networks, or between the computing system and a public switched telephone network (PSTN).

The system 500 can comprise removable memory such as flash memory cards (e.g., SD (Secure Digital) cards), memory sticks, Subscriber Identity Module (SIM) cards). The memory in system 500 (including caches 512 and 514, memories 516 and 518, and storage device 590) can store data and/or computer-executable instructions for executing an operating system 594 and application programs 596. Example data includes web pages, text messages, images, sound files, and video data biometric thresholds for particular users or other data sets to be sent to and/or received from one or more network servers or other devices by the system 500 via the one or more wired or wireless networks 586, or for use by the system 500. The system 500 can also have access to external memory or storage (not shown) such as external hard drives or cloud-based storage.

Figure 6:
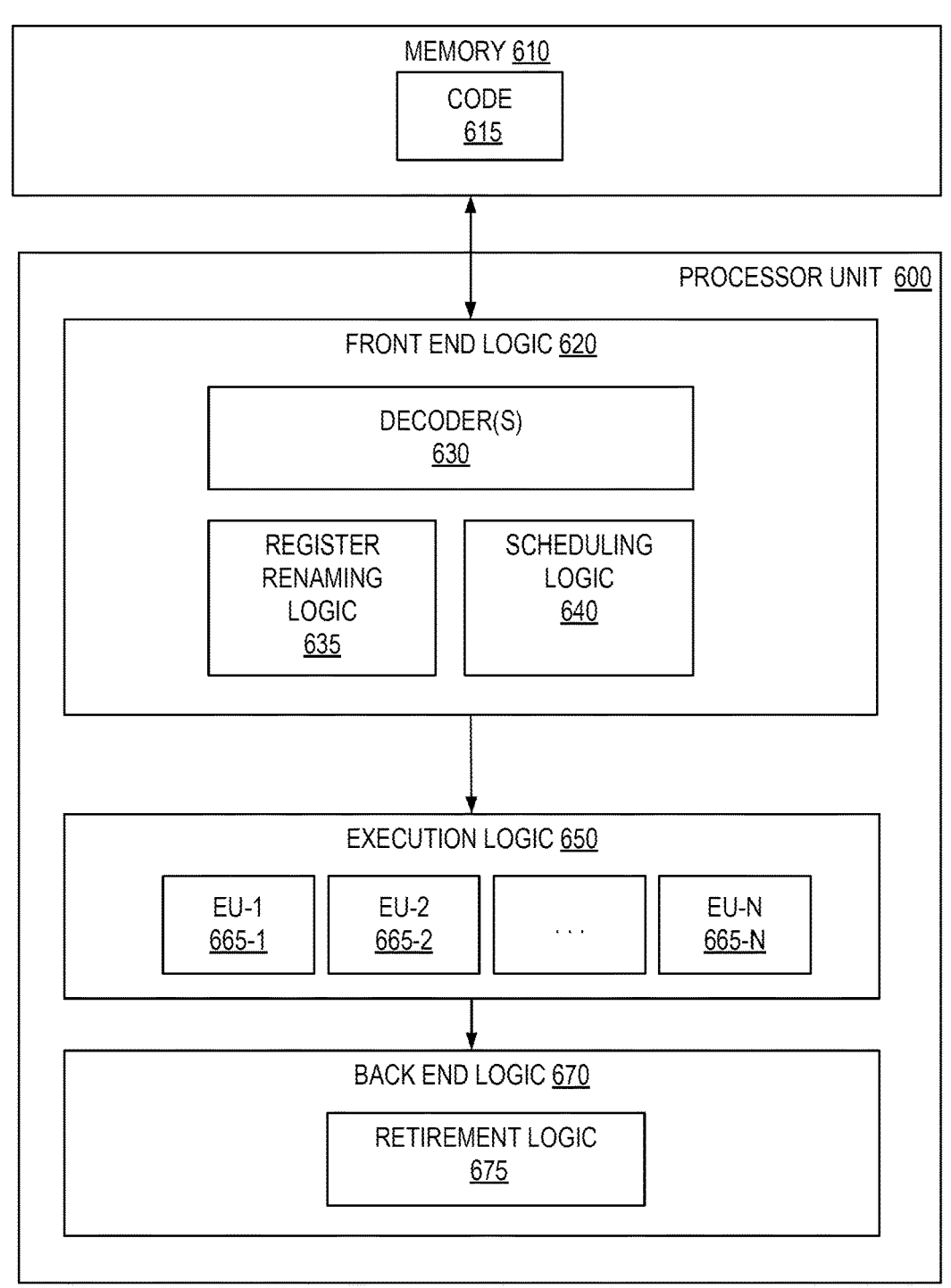
FIG. 6 is a block diagram of an example processor unit to execute computer-executable instructions as part of implementing technologies described herein.

The operating system 594 (also simplified to "OS" herein) can control the allocation and usage of the components illustrated in FIG. 6 and support the one or more application programs 596. The application programs 596 can include common computing system applications (e.g., email applications, calendars, contact managers, web browsers, messaging applications) as well as other computing applications.

In some embodiments, a hypervisor (or virtual machine manager) operates on the operating system 594 and the application programs 596 operate within one or more virtual machines operating on the hypervisor. In these embodiments, the hypervisor is a type-2 or hosted hypervisor as it is running on the operating system 594. In other hypervisor-based embodiments, the hypervisor is a type-1 or "bare-metal" hypervisor that runs directly on the platform resources of the computing system 594 without an intervening operating system layer.

In some embodiments, the applications 596 can operate within one or more containers. A container is a running instance of a container image, which is a package of binary images for one or more of the applications 596 and any libraries, configuration settings, and any other information that one or more applications 596 need for execution. A container image can conform to any container image format, such as Docker®, Appc, or LXC container image formats. In container-based embodiments, a container runtime engine, such as Docker Engine, LXU, or an open container initiative (OCI)-compatible container runtime (e.g., Railcar, CRI-O) operates on the operating system (or virtual machine monitor) to provide an interface between the containers and the operating system 594. An orchestrator can be responsible for management of the computing system 500 and various container-related tasks such as deploying container images to the computing system 594, monitoring the performance of deployed containers, and monitoring the utilization of the resources of the computing system 594.

The computing system 500 can support various additional input devices, represented generally as user interfaces 598, such as a touchscreen, microphone, monoscopic camera, stereoscopic camera, trackball, touchpad, trackpad, proximity sensor, light sensor, electrocardiogram (ECG) sensor, PPG (photoplethysmogram) sensor, galvanic skin response sensor, and one or more output devices, such as one or more speakers or displays. Other possible input and output devices include piezoelectric and other haptic I/O devices. Any of the input or output devices can be internal to, external to, or removably attachable with the system 500. External input and output devices can communicate with the system 500 via wired or wireless connections.

In addition, one or more of the user interfaces 598 may be natural user interfaces (NUIs). For example, the operating system 594 or applications 596 can comprise speech recognition logic as part of a voice user interface that allows a user to operate the system 500 via voice commands. Further, the computing system 500 can comprise input devices and logic that allows a user to interact with computing the system 500 via body, hand, or face gestures. For example, a user's hand gestures can be detected and interpreted to provide input to a gaming application.

The I/O devices 564 can include at least one input/output port comprising physical connectors (e.g., USB, IEEE 1394 (FireWire), Ethernet, RS-232), a power supply (e.g., battery), a global satellite navigation system (GNSS) receiver (e.g., GPS receiver); a gyroscope; an accelerometer; and/or a compass. A GNSS receiver can be coupled to a GNSS antenna. The computing system 500 can further comprise one or more additional antennas coupled to one or more additional receivers, transmitters, and/or transceivers to enable additional functions.

In addition to those already discussed, integrated circuit components, integrated circuit constituent components, and other components in the computing system 594 can communicate with interconnect technologies such as Intel® QuickPath Interconnect (QPI), Intel® Ultra Path Interconnect (UPI), Computer Express Link (CXL), cache coherent interconnect for accelerators (CCIX®), serializer/deserializer (SERDES), Nvidia® NVLink, ARM Infinity Link, Gen-Z, or Open Coherent Accelerator Processor Interface (OpenCAPI). Other interconnect technologies may be used and a computing system 594 may utilize more or more interconnect technologies.

It is to be understood that FIG. 5 illustrates only one example computing system architecture. Computing systems based on alternative architectures can be used to implement technologies described herein. For example, instead of the processors 502 and 504 and the graphics engine 552 being located on discrete integrated circuits, a computing system can comprise an SoC (system-on-a-chip) integrated circuit incorporating multiple processors, a graphics engine, and additional components. Further, a computing system can connect its constituent component via bus or point-to-point configurations different from that shown in FIG. 5. Moreover, the illustrated components in FIG. 5 are not required or all-inclusive, as shown components can be removed and other components added in alternative embodiments.

FIG. 6 is a block diagram of an example processor unit 600 to execute computer-executable instructions as part of implementing technologies described herein. The processor unit 600 can be a single-threaded core or a multithreaded core in that it may include more than one hardware thread context (or "logical processor") per processor unit.

FIG. 6 also illustrates a memory 610 coupled to the processor unit 600. The memory 610 can be any memory described herein or any other memory known to those of skill in the art. The memory 610 can store computer-executable instructions 615 (code) executable by the processor unit 600.

The processor unit comprises front-end logic 620 that receives instructions from the memory 610. An instruction can be processed by one or more decoders 630. The decoder 630 can generate as its output a micro-operation such as a fixed width micro-operation in a predefined format, or generate other instructions, microinstructions, or control signals, which reflect the original code instruction. The front-end logic 620 further comprises register renaming logic 635 and scheduling logic 640, which generally allocate resources and queues operations corresponding to converting an instruction for execution.

The processor unit 600 further comprises execution logic 650, which comprises one or more execution units (EUs) 665-1 through 665-N. Some processor unit embodiments can include a few execution units dedicated to specific functions or sets of functions. Other embodiments can include only one execution unit or one execution unit that can perform a particular function. The execution logic 650 performs the operations specified by code instructions. After completion of execution of the operations specified by the code instructions, back-end logic 670 retires instructions using retirement logic 675. In some embodiments, the processor unit 600 allows out of order execution but requires in-order retirement of instructions. Retirement logic 675 can take a variety of forms as known to those of skill in the art (e.g., re-order buffers or the like).

The processor unit 600 is transformed during execution of instructions, at least in terms of the output generated by the decoder 630, hardware registers and tables utilized by the register renaming logic 635, and any registers (not shown) modified by the execution logic 650.

While at least one embodiment has been presented in the foregoing detailed description, it should be appreciated that a vast number of variations exist. It should also be appreciated that the disclosed embodiments are only examples, and are not intended to limit the scope, applicability, or configuration of the disclosure in any way. Rather, the foregoing detailed description will provide those skilled in the art with a convenient road map for implementing the disclosed aspects of the present disclosure. Various changes can be made in the function and arrangement of elements without departing from the scope of the disclosure as set forth in the appended claims and the legal equivalents thereof.

As used herein, a "computer," "computing system," or "compute device" refers to any of a variety of computing devices and includes systems comprising multiple discrete physical components capable of executing instructions. In some embodiments, the computing systems are located in a data center, such as an enterprise data center (e.g., a data center owned and operated by a company and typically located on company premises), managed services data center (e.g., a data center managed by a third party on behalf of a company), a collocated data center (e.g., a data center in which data center infrastructure is provided by the data center host and a company provides and manages their own data center components (servers, etc.)), cloud data center (e.g., a data center operated by a cloud services provider that host companies applications and data), and an edge data center (e.g., a data center, typically having a smaller footprint than other data center types, located close to the geographic area that it serves).

Thus, the term "computer-executable instruction" refers to instructions that can be executed by any computing system, device, or machine described or mentioned herein as well as any other computing system, device, or machine capable of executing instructions. As mentioned, any of the disclosed methods (or a portion thereof) can be implemented as computer-executable instructions or a computer program product. Such instructions can cause a computing system or one or more processor units capable of executing computer-executable instructions to perform any of the disclosed methods.

The computer-executable instructions or computer program products as well as any data created and/or used during implementation of the disclosed technologies can be stored on one or more tangible or non-transitory computer-readable storage media, such as volatile memory (e.g., DRAM, SRAM), non-volatile memory (e.g., flash memory, chalcogenide-based phase-change non-volatile memory) optical media discs (e.g., DVDs, CDs), and magnetic storage (e.g., magnetic tape storage, hard disk drives). Computer-readable storage media can be contained in computer-readable storage devices such as solid-state drives, USB flash drives, and memory modules. Alternatively, any of the methods disclosed herein (or a portion) thereof may be performed by hardware components comprising non-programmable circuitry. In some embodiments, any of the methods herein can be performed by a combination of non-programmable hardware components and one or more processing units executing computer-executable instructions stored on computer-readable storage media.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, C#, assembly language, or any other programming language. Likewise, the disclosed technologies are not limited to any computer system or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

Additionally, theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

As used herein, phrases such as "embodiments," "an aspect of the present disclosure," "various aspects of the present disclosure," "some aspects of the present disclosure," and the like, indicate that some aspects of the present disclosure may have some, all, or none of the features described for other aspects of the present disclosure. "First," "second," "third," and the like describe a common object and indicate different instances of like objects being referred to; unless specifically stated, they do not imply a given sequence, either temporally or spatially, in ranking, or any other manner. In accordance with patent application parlance, "connected" indicates elements that are in direct physical or electrical contact with each other and "coupled" indicates elements that co-operate or interact with each other, coupled elements may or may not be in direct physical or electrical contact. Furthermore, the terms "comprising," "including," "having," and the like, are utilized synonymously to denote non-exclusive inclusions.

As used in this application and the claims, a list of items joined by the term "at least one of" can mean any combination of the listed terms. For example, the phrase "at least one of A, B and C" can mean A; B; C; A and B; A and C; B and C; or A, B, and C. Similarly, as used in this application and the claims, a list of items joined by the term "one or more of" can mean any combination of the listed terms. For example, the phrase "one or more of A, B and C" can mean A; B; C; A and B; A and C; B and C; or A, B, and C.

The following Examples pertain to additional aspects of the present disclosure of technologies disclosed herein.

EXAMPLES

Example 1 is a system, comprising: a reference device; a control circuit communicatively coupled to the reference device, wherein the control circuit is to: receive a mixed media data signal from an external device; receive a user preference to customize the mixed media data signal for display on the reference device; create a customized data stream as a function of the user preference; display the customized data stream on the reference device.

Example 2 includes the subject matter of Example 1, wherein the control circuit is further to: generate a prompt on the reference device responsive to receiving the mixed media data signal, wherein the prompt enables a user to select from among block, pass, convert, and filter; detect a user selection responsive to the prompt, wherein the user selection is the user preference to customize the mixed media data signal.

Example 3 includes the subject matter of Example 2, wherein the user selection is convert, and the control circuit is further to create the customized data stream by converting the mixed media data signal to an avatar data stream.

Example 4 includes the subject matter of Example 2, wherein the user selection is filter, and the control circuit is further to create the customized data stream by processing the mixed media data signal with an algorithm to remove distracting behavior.

Example 5 includes the subject matter of Example 1 wherein the control circuit is further to: create the customized data stream on a cloud server; transmit the customized data stream to the reference device via a network.

Example 6 includes the subject matter of Example 1, wherein the control circuit is further to create the customized data stream on the reference device.

Example 7 includes the subject matter of Example 1 wherein the mixed media data signal further comprises an audio signal, and the control circuit is further to: determine that the user preference is to convert the audio signal into an audio avatar data stream; create the customized data stream as an audio avatar data stream.

Example 8 includes the subject matter of Example 1, wherein the mixed media data signal is one of a plurality of mixed media data signals, and the control circuit is further to: receive the plurality of mixed media data signals; receive, for the plurality of mixed media data signal, a respective user preference to customize the mixed media data signal for display on the reference device; create a respective plurality of customized data streams; display the respective plurality of customized data streams concurrently on the reference device.

Example 9 is a non-transitory computer-readable media comprising instructions that are, when executed by processing circuitry, to: receive a mixed media data signal from an external device; receive a user preference to customize the mixed media data signal for display on a reference device; create a customized data stream as a function of the user preference; display the customized data stream on the reference device.

Example 10 includes the subject matter of Example 9, wherein the instructions are further to: generate a prompt on the reference device responsive to receiving the mixed media data signal, wherein the prompt enables a user to select from among block, pass, convert, and filter; detect a user selection responsive to the prompt, wherein the user selection is the user preference to customize the mixed media data signal.

Example 11 includes the subject matter of Example 10, wherein the instructions are further to: determine that the user selection is convert; create the customized data stream by converting the mixed media data signal to an avatar data stream, responsive to determining that the user selection is convert.

Example 12 includes the subject matter of Example 10, wherein the instructions are further to: determine that the user selection is filter; create the customized data stream by processing the mixed media data signal with an algorithm to remove distracting behavior, responsive to determining that the user selection is filter.

Example 13 includes the subject matter of Example 9, wherein the instructions are further to: create the customized data stream on a cloud server; transmit the customized data stream to the reference device via a network.

Example 14 includes the subject matter of Example 9, wherein the instructions are further to create the customized data stream on the reference device.

Example 15 includes the subject matter of Example 9, wherein the mixed media data signal further comprises an audio signal, and the instructions are further to: determine that the user preference is to convert the audio signal into an audio avatar data stream; create the customized data stream as an audio avatar data stream.

Example 16 includes the subject matter of Example 9, wherein the mixed media data signal is one of a plurality of mixed media data signals, and the instructions are further to: receive the plurality of mixed media data signals; receive, for the plurality of mixed media data signal, a respective user preference to customize the mixed media data signal for display on the reference device; create a respective plurality of customized data streams; display the respective plurality of customized data streams concurrently on the reference device.

Example 17 is a method, comprising: receiving a mixed media data signal from an external device; receiving a user preference to customize the mixed media data signal for display on a reference device; creating a customized data stream as a function of the user preference; displaying the customized data stream on the reference device.

Example 18 includes the subject matter of Example 17, further comprising: generating a prompt on the reference device responsive to receiving the mixed media data signal, wherein the prompt enables a user to select from among block, pass, convert, and filter; detecting a user selection responsive to the prompt, wherein the user selection is the user preference to customize the mixed media data signal.

Example 19 includes the subject matter of Example 18, further comprising: determining that the user selection is convert; and creating the customized data stream by converting the mixed media data signal to an avatar data stream.

Example 20 includes the subject matter of Example 18, further comprising: determining that the user selection is filter; creating the customized data stream by processing the mixed media data signal with an algorithm to remove distracting behavior.

What is claimed is:

1. A system, comprising:
   a demultiplexing module configured to receive a combined media stream including mixed media data input provided by a plurality of external devices, and output a plurality of constituent data streams corresponding to the plurality of external devices, respectively; and
   a control circuit to be communicatively coupled to a reference device configured to receive media streams for display, wherein, when communicatively coupled to the reference device, the control circuit is to:
   receive the plurality of constituent data streams from the demultiplexing module;
   receive a user preference to customize at least a first constituent data stream of the plurality of constituent data streams;
   convert the first constituent data stream of the plurality of constituent data streams into a customized data stream based on the user preference, wherein to convert the first constituent data stream is to include converting at least a portion of a video signal of the first constituent data stream; and
   cause the customized data stream and at least one other constituent data stream of the plurality of constituent data streams to be combined into a combined output media stream to be displayed on the reference device.

2. The system of claim 1, wherein the control circuit is further to:
   generate a prompt to be displayed on the reference device responsive to receiving the plurality of constituent data streams for a user to select block, pass, convert, or filter, wherein a user selection responsive to the prompt is the user preference to customize the first constituent data stream.

3. The system of claim 2, wherein, based on the user selection being convert, the control circuit is further to create the customized data stream by converting the first constituent data stream to an avatar data stream.

4. The system of claim 2, wherein, based on the user selection being filter, the control circuit is further to create the customized data stream by processing the first constituent data stream with an algorithm to remove distracting behavior from the video signal.

5. The system of claim 1, wherein the control circuit is further to:
   create the customized data stream on a cloud server; and
   transmit the combined output media stream to the reference device via a network.

6. The system of claim 1, wherein the control circuit is further to create the customized data stream on the reference device.

7. The system of claim 1, wherein the first constituent data stream further comprises an audio signal, and the control circuit is further to:
   determine, based on the user preferences to convert the audio signal into an audio avatar data stream; and
   create an audio avatar data stream from the audio signal, wherein the customized data stream includes the audio avatar data stream.

8. The system of claim 1, wherein the control circuit is further to:
   receive, for the plurality of constituent data streams, respective user preferences to customize the plurality of constituent data streams for display on the reference device; and
   create a respective plurality of customized data streams based on the respective user preferences, wherein the respective plurality of customized data streams are to be combined into the combined output media stream and displayed concurrently on the reference device.

9. A non-transitory computer-readable media comprising instructions that when executed by processing circuitry, cause the processing circuitry to:

receive mixed media data signals including at least a first constituent data stream corresponding to a first external device and a second constituent data stream corresponding to a second external device, respectively, wherein the first constituent data stream includes at least a first video signal and the second constituent data stream includes at least a second video signal;

receive a first user preference of a user of a reference device to customize at least the first constituent data stream;

receive a second user preference of the user to customize the second constituent data stream;

convert the first constituent data stream into a first customized data stream based on the first user preference, wherein to convert the first constituent data stream is to include converting the first video signal;

convert the second constituent data stream into a second customized data stream based on the second user preference, wherein to convert the second constituent data stream is to include converting the second video signal; and cause the first customized data stream and the second customized data stream to be combined into a combined output media stream to be displayed on the reference device configured to receive media streams for display.

10. The non-transitory computer-readable media of claim 9, wherein the instructions, when executed by the processing circuitry, cause the processing circuitry further to:

generate a prompt to be displayed on the reference device responsive to receiving the mixed media data signals for a user to select block, pass, convert, or filter, wherein a first user selection responsive to the prompt is the first user preference to customize the first constituent data stream, wherein a second user selection responsive to the prompt is the second user preference to customize the second constituent data stream.

11. The non-transitory computer-readable media of claim 10, wherein the instructions, when executed by the processing circuitry, cause the processing circuitry further to:

determine that the first user selection is convert; and create the first customized data stream by converting the first constituent data stream to an avatar data stream, responsive to determining that the first user selection is convert.

12. The non-transitory computer-readable media of claim 10, wherein the instructions, when executed by the processing circuitry, cause the processing circuitry further to:

determine that the second user selection is filter; and create the second customized data stream by processing the second constituent data stream with an algorithm to remove distracting behavior, responsive to determining that the second user selection is filter.

13. The non-transitory computer-readable media of claim 9, wherein the instructions, when executed by the processing circuitry, cause the processing circuitry further to:

create the first customized data stream and the second customized data stream on a cloud server; and transmit the combined output media stream to the reference device via a network.

14. The non-transitory computer-readable media of claim 9, wherein the instructions are further to create the first customized data stream and the second customized data stream on the reference device.

15. The non-transitory computer-readable media of claim 9, wherein a third constituent data stream of the mixed media data signals comprises an audio signal, and the instructions, when executed by the processing circuitry, cause the processing circuitry further to:

determine that a third user preference is to convert the audio signal into an audio avatar data stream; and create a third customized data stream as an audio avatar data stream, wherein the third customized data stream is to be combined into the combined output media stream.

16. A system, comprising:

a first means for sorting a combined media stream into a plurality of constituent data streams corresponding to a plurality of external devices, respectively, wherein the combined media stream includes mixed media data input Provided by the plurality of external devices; and a second means for receive-side customization, communicatively coupled to a reference device configured to receive media streams for display, wherein the second means is to:

receive the plurality of constituent data streams from the first means;

receive a user preference to customize at least one constituent data stream of the plurality of constituent data streams, for display on the reference device;

convert a first constituent data stream of the plurality of constituent data streams into an avatar data stream based on the user preference, wherein the avatar data stream includes an avatar, wherein to convert the first constituent data stream includes converting at least a portion of a video signal of the first constituent data stream; and cause the avatar data stream and at least one other constituent data stream of the plurality of constituent data streams to be combined into a combined output media stream to be displayed on the reference device.

17. The system of claim 16, wherein the second means for receive-side customization is further to:

generate a prompt on the reference device responsive to receiving the plurality of constituent data streams, for a user to select block, pass, convert, or filter, wherein a user selection responsive to the prompt is the user preference to customize the first constituent data stream.

18. The system of claim 17, wherein the second means for receive-side customization is further to:

determine that a second user selection is filter; and create a customized data stream to be displayed on the reference device concurrently with the avatar data stream, wherein the customized data stream is to be created by processing a second constituent data stream of the plurality of constituent data streams with an algorithm to remove distracting behavior.

19. The system of claim 16, wherein to convert the first constituent data stream into the avatar data stream is to include generating the avatar from the video signal or from an audio signal of the first constituent data stream.

20. The system of claim 1, wherein the at least one other constituent data stream is a second customized data stream to be combined into the combined output media stream.

\* \* \* \* \*